EXHAUST RECIRCULATION CONTROL FOR AN ENGINE

Original Filed May 1, 1967 2 Sheets-Sheet 1

INVENTOR
Brooks Walker

EXHAUST RECIRCULATION CONTROL FOR AN ENGINE

Original Filed May 1, 1967 2 Sheets-Sheet 2

INVENTOR
Brook Walker

United States Patent Office

Re. 27,993
Reissued Apr. 30, 1974

27,993
EXHAUST RECIRCULATION CONTROL FOR AN ENGINE

Brooks Walker, 1280 Columbus Ave., San Francisco, Calif. 94133

Original No. 3,507,260, dated Apr. 21, 1970, Ser. No. 635,002, May 1, 1967. Application for reissue Apr. 20, 1972, Ser. No. 246,077
Int. Cl. F02m *25/06*
U.S. Cl. 123—119 A 26 Claims

Matter enclosed in heavy brackets [ ] appears in the original patent but forms no part of this reissue specification; matter printed in italics indicates the additions made by reissue.

ABSTRACT OF THE DISCLOSURE

This invention pertains to a device to control recirculation of some of the exhaust gases carbureted in a four stroke cycle internal combustion engine during some selected driving cycles but not all to reduce the nitrogen oxides in the exhaust. Nitrogen oxides are produced in the combustion chamber of an engine when the temperatures of combustion are high and the mixture is lean. They are usually lower and within the present and contemplated future limits of control when (1) The engine is idling and on very low power at lower speeds (2) At high power when the power valve enriches the mixture over the level cruise mixture as nitrogen oxides are not present in as large a percent with a rich or substantially richer than lean mixture.

This invention cuts out or greatly reduces the recycle of exhaust gases at idle and below a predetermined engine speed, such as 1000 r.p.m., automatically by a speed sensor if desired. The recycle is also cut out by an intake suction sensor at about or just after the power valve of the carburetor comes in, say, when the intake suction drops below 5" suction in order not to dilute the mixture entering the cylinders at high power below 5" as such dilution is not needed to meet the nitrogen oxides standards as contemplated for future vehicles at these power conditions and if diluted the engine maximum power will or might be diluted.

The objects of the invention are to provide exhaust recirculation to form part of the charge to the engine cylinders between a predetermined engine speed near 1000 r.p.m. and an intake suction over 5" Hg measured relative to atmospheric (if wide open, the suction would be very low 1–2" Hg at high speed).

Another object is to use an engine speed sensor to cut off or greatly reduce the exhaust recycle volume below a selected engine speed and allow such recycling of part of the exhaust to the intake between such speed and operating conditions with a suction higher than a selected minimum suction, such as 5" Hg plus or minus, for optimum fuel atomization and reduced oxides of nitrogen content of the exhaust.

Another object is to provide an intake suction operated valve to control the recirculation of part of the exhaust to close off or greatly reduce the exhaust recycle at closed throttle idle and decelerations and also at operating conditions when the intake suction is less than a predetermined limit, such as 5" Hg, or when the power valve comes in and to open the recirculation valve to varying degrees between idle and said minimum suction as when the power valve is on in which case a speed sensor valve may not be necessary.

Another object is to enclose the recycle of part of the exhaust within the intake manifold with no exterior controls of the flow of recycled exhaust.

Other features will be more particularly pointed out in the accompanying specification and claims.

These and other objects and advantages of the invention will become apparent from the following detailed description of the invention in connection with the drawings wherein.

Figure 1:
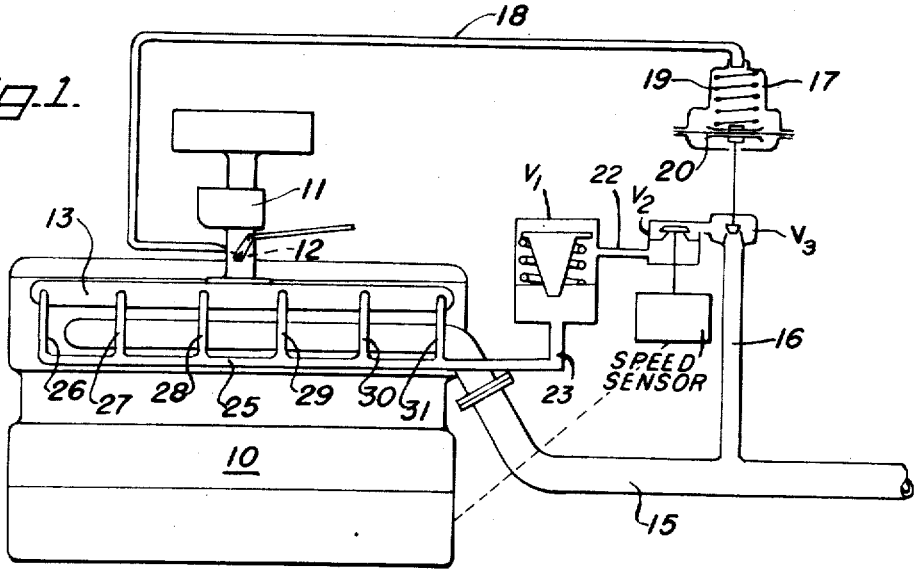
FIG. 1 is a plan view, mostly diagrammatic, showing a preferred form of the invention.

In FIG. 1 I have shown an engine 10, a carburetor 11 with a butterfly throttle 12, an intake manifold 13, an exhaust manifold, and an exhaust pipe 15.

Pipe 16 connects to valve v3 which is controlled by a suction actuated motor 17 with a preloaded spring 19 so that diaphragm 20 moves valve 3 to open position when the suction in the intake manifold is above a limit such as 5" Hg and closed when the intake suction is less than about 5" Hg as measured by a vacuum or suction gage (that is very low suction 1–2" Hg when wide open at higher speeds). Line 18 conveys intake manifold suction from manifold 13 to valve actuating motor 17. Line 21 connects valve v3 to speed sensing valve v2 which may be actuated by the pressure from a pitot tube at the perimeter of a cooling water pump acting on one side of a diaphragm and the pressure from the intake to said water pump acting on the other side of the diaphragm to neutralize the effect of the radiator pressure cap, all as explained in U.S. Patent No. 3,204,620, issued Sept. 7, 1965, entitled "Speed Sensing Device," to Brooks Walker, the inventor in the case.

This valve v2 is closed below a predetermined engine speed, such as 1000 r.p.m. plus or minus. Line 22 connects speed sensing valve v2 to valve v1 which may be a variable orifice valve actuated by intake suction to give a larger opening to exhaust flow at low intake manifold suction than at high intake suction if such a control is desired.

Line 23 can lead directly to the engine side of the carburetor 11 or to a manifold 25 from which tubes 26, 27, 28, 29, 30 and 31 lead to a point near each intake valve, as is shown for a 6-cylinder engine 10 in FIG. 1, for better distribution of the recycled exhaust.

In operation at speeds below a selected speed, such as 1000 r.p.m., the exhaust recycle through lines 16, valve v3, line 21, valve v2, line 22, valve v1 and line 23 will be shut off or greatly restricted by speed sensor valve v2. At speeds about 1000 r.p.m. and operating conditions with suction in intake manifold 13 higher than the selected suction for valve v3, valve v3 will be open as are valves v2 and v1 so that exhaust will flow to intake 13 until the throttle 12 is opened and the engine speed is such that the intake suction falls below the selected suction of actuation of valve v3. Valve v3 will then close to shut off exhaust flow or greatly restrict such flow for maximum engine power at wide open throttle operation. The volume of flow may be controlled further by a flow control valve v1 somewhat similar to a crankcase ventilator valve such as disclosed in U.S. Patent 3,105,477.

If distribution of exhaust gases to each cylinder is desired, a manifold 25 and extension tubes 26, 27, 28, 29, 30 and 31 may be used.

Figure 2:
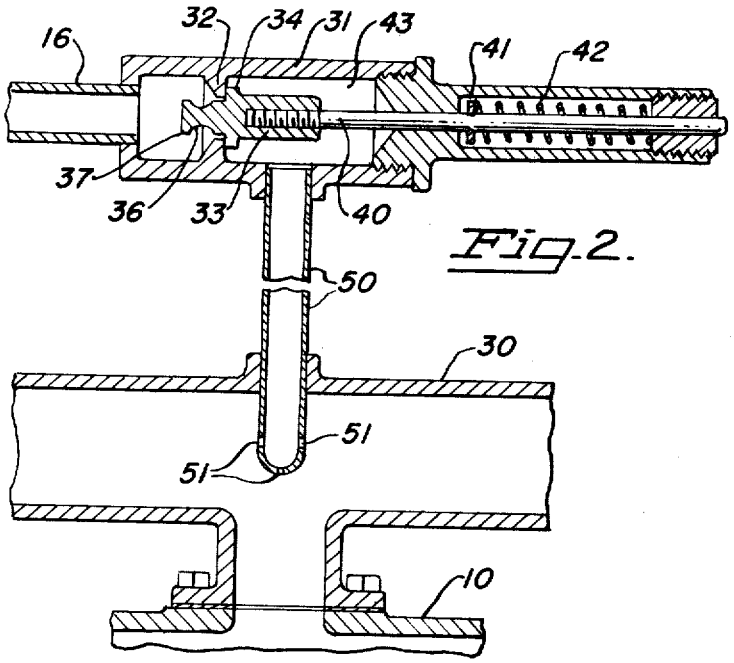
FIG. 2 is an elevation view, mostly diagrammatic, of another form of the invention and the exhaust recycle system.

In FIG. 2 I have shown an engine 10 having an intake manifold 30'. A tube or pipe 16 leads from the exhaust manifold or pipe 15 to valve assembly 31' which includes a seat and restrictor section 32. Movable valve 33 is urged to the left, as viewed in FIG. 2, so that seat 34 abuts against restriction section 32 by spring 42 and collar 41 on stem 40 so that no exhaust gas flows from pipe 16 to pipe 50 and ports 51 to intake manifold 30 when the suction in intake manifold 30, pipe 50 and area 43 of valve assembly 31 is less than a predetermined amount such as 5" Hg or such suction as opens the power valve in the carburetor which supplies fuel to this engine 10. As the suction in manifold 30 increases with the closing of the throttle from the selected 5" Hg suction operation, valve 33 will be sucked part way open to where reduced area 36 will allow the desired amount of exhaust recirculation to give the desired oxides of nitrogen control and maintain proper engine performance. The contour of restricted area 36 can be tailored to meet the California or U.S. emission standards of oxides of nitrogen. As the engine approaches the closed throttle idle or deceleration operation, suction on valve 33 will cause valve 33 to move to the right, as viewed in FIG. 2, until section 37 comes under the opening in section 32 of valve 31. In this position of valve 33 the flow of exhaust gas from valve tube 16 to tube 50 and intake manifold 30 will be greatly restricted or substantially cut off.

Figure 3:
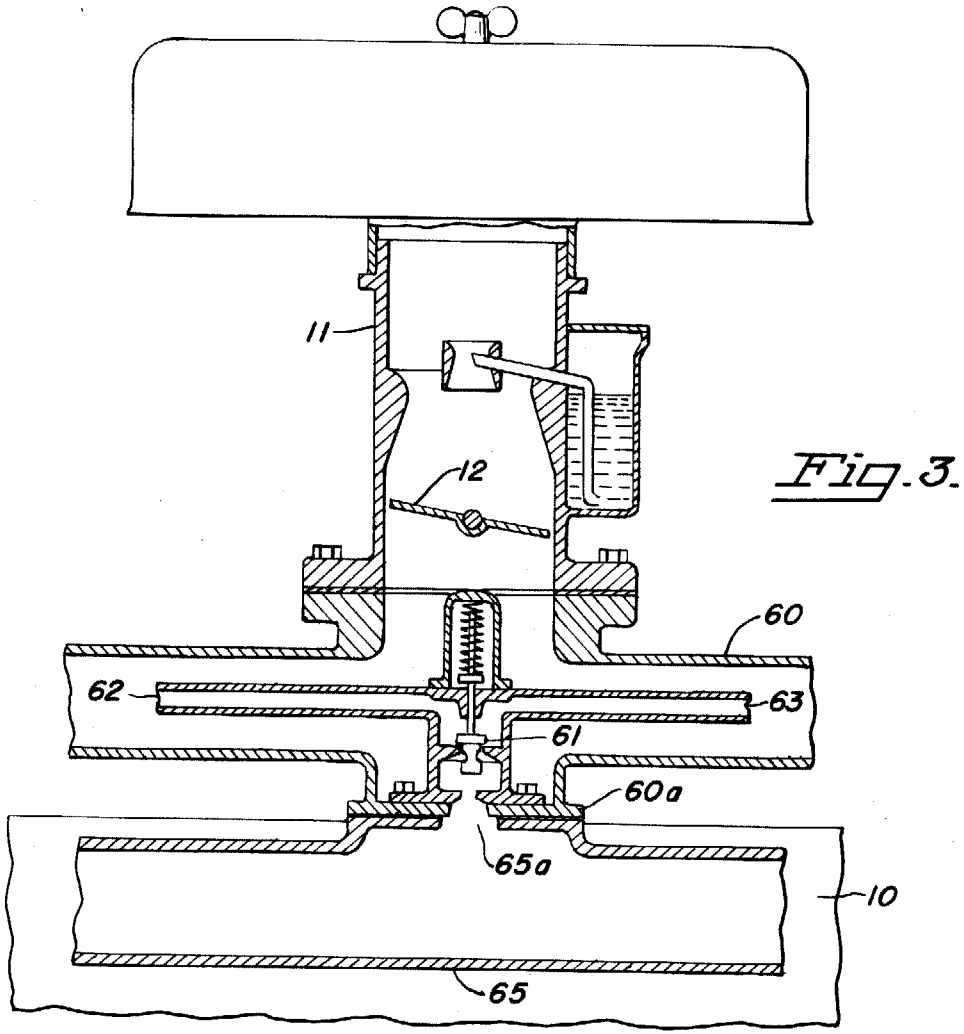
FIG. 3 is a side elevation, partly cut away, showing another form of the invention and recycle system.

In FIG. 3 I have shown an engine 10, an intake manifold 60, an exhaust manifold 65.

A valve assembly 61 is secured to manifold 60 at heat riser section 60a and receives exhaust gases through port 65a of exhaust manifold 65. Valve assembly 61 is similar to valve 31 of FIG. 2 and operates in the same manner except that it is all enclosed in intake manifold 60 and requires no control exterior of manifold 60. Tubes 62 and 63 lead to the appropriate locations in the intake manifold for proper distribution of the hot exhaust gas when recirculating.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim as my invention:

1. An exhaust recirculation control for an internal combustion engine having an exhaust conduit for conducting exhaust gases from the engine and an inlet conduit for conducting a combustible fluid to the engine comprising, a connecting conduit connecting the exhaust conduit to the inlet conduit and valve means for controlling the flow of exhaust gases through said connecting conduit, said valve means comprising a valve for minimizing the flow of exhaust gas at speeds below a selected minimum speed of rotation of the engine and a valve for minimizing the flow of exhaust gas at a preselected suction pressure in the inlet conduit.

2. A control apparatus as defined in claim 1 further including a valve for permitting a maximum flow of exhaust gas at low intake suction pressure in the intake conduit and a reduced flow at a higher intake suction pressure in said intake conduit.

3. An exhaust recirculation control for an internal combustion engine having an exhaust conduit and an inlet conduit for conducting a combustible fluid to the engine comprising, a connecting conduit connecting the exhaust conduit to the inlet conduit and valve means for controlling the flow of exhaust gases *only* through said connecting conduit, said valve mean comprising a valve for minimizing the flow at pressures above a first preselected suction and below a second preselected suction in said inlet conduit and for regulating the flow in amounts greater than said minimized flows with the suction pressure in a zone between said preselected suction pressures.

*4. An exhaust recirculation control as defined in claim 1, further including a valve having a variable size orifice in said connecting conduit and activated by intake suction to give a larger opening to exhaust flow at low intake manifold suction than at high intake suction.*

*5. An exhaust recirculation control for an internal combustion engine having an exhaust conduit for conducting exhaust gases from the engine and an inlet conduit for conducting at least air to the engine and a throttle valve in said inlet conduit, comprising means for connecting the exhaust conduit to the inlet conduit, a variable size orifice in said means for connecting, for conducting exhaust gases only into said inlet conduit means for greatly restricting the flow of exhaust gases through said means for connecting under engine idle conditions, and control means activated directly by intake suction and exhaust back pressure working together in the same direction for varying the size of said orifice to give a larger opening to exhaust flow therethrough at low intake manifold suctions, which lie below atmospheric pressure, than at selected high intake manifold suctions which lie further below atmospheric pressure than said low suctions but are closer to atmospheric pressure than the suction at engine idle conditions.*

*6. An exhaust recirculation control for an internal combustion engine having an exhaust conduit for conducting exhaust gases from the engine and an inlet conduit for conducting at least air to the engine and a throttle valve in said inlet conduit, comprising means for connecting the exhaust conduit to the inlet conduit, means for controlling the flow of exhaust gases through said means for connecting, said means for controlling comprising means for greatly restricting the flow of exhaust gas below the suction pressure in the inlet conduit corresponding to engine operation at wide-open throttle, a variable size orifice in said means for connecting, for conducting exhaust gases only into said inlet conduit, and means activated by intake suction between said throttle and said engine for varying the size of said orifice to give a larger opening to exhaust flow therethrough at low intake manifold suctions, which lie below atmospheric pressure, than at high intake manifold suctions lying further below atmospheric pressure but not so far below as under engine idle conditions.*

*7. The exhaust recirculation control of claim 6 wherein said means for controlling includes means for greatly restricting the flow of exhaust gases through said means for connecting under engine idle conditions.*

*8. An exhaust recirculation control for an internal combustion engine having an exhaust conduit, an inlet conduit and valve means for controlling the flow of ex- and a throttle in said inlet conduit, comprising a connecting conduit connecting the exhaust conduit to the inlet conduit and valve means for controlling the flow of exhaust gases through said connecting conduit, said valve means comprising a controlled variable sized opening for admitting exhaust gases only into said inlet conduit, and control means therefor for causing said opening to control the flow of exhaust recirculating through said conduit so that said opening is smaller at idle than when the intake suctions lower are at certain lower levels closer to atmospheric pressure, both said controlled variable opening and its said control means being located entirely within said intake, exhaust, and connecting conduits.*

*9. An exhaust recirculation control for an automotive vehicle internal combustion engine subject to nitrogen oxide emission standards and having an intake manifold and supplied with a fuel-air mixture by a fuel supply device having*

*a throttle valve and a suction-responsive power valve actuated by suction originating in the intake manifold, the engine having an inlet conduit for conducting the fuel-air mixture to the engine,*

*an exhaust conduit for conducting exhaust gases from the engine, comprising*

*connecting means for at times conducting said exhaust* gases from said exhaust conduit to said inlet conduit and control means for controlling the flow of exhaust gases through said connecting means, said controlling means including means for permitting flow of exhaust gases through said connecting means only at suction values further below atmospheric pressure than a predetermined suction and means for permitting flow of said exhaust gases through said connecting conduit, even then, only when the engine is operating at engine speeds in excess of a predetermined engine speed, said controlling means being free of any mechanical connection to said throttle valve and free of any means therein for supplying atmospheric air to said exhaust gases.

10. An exhaust recirculation control for an automotive vehicle internal combustion engine subject to nitrogen oxide emission standards and having an intake manifold and supplied with a fuel-air mixture by a fuel supply device having a throttle valve and a suction-responsive power valve actuated by suction originating in the intake manifold, the engine having an inlet conduit for conducting the fuel-air mixture to the engine an exhaust conduit for conducting exhaust gases from the engine, comprising connecting means for at times conducting said exhaust from said exhaust conduit to said inlet conduit and control means for controlling the flow of exhaust gases through said connecting means, said controlling means including means for preventing or greatly reducing flow of exhaust gases through said connecting means at engine speeds below a predetermined speed and permitting such exhaust gas flow at or above said predetermined engine speed and means for even then preventing the flow of said exhaust gases through said connnecting conduit except at engine operating conditions where said suction results in pressures in said inlet conduit lying further below atmospheric pressure than the suction value at which said power valve is operative.

11. An exhaust recirculation control for an internal combustion engine having an exhaust conduit and an inlet conduit having a throttle valve for conducting at least air to the engine past said throttle valve comprising, a connecting conduit connecting the exhaust conduit to the inlet conduit and valve means operated by pressures within said engine for controlling the flow of exhaust gases only through said connecting conduit, said valve means comprising a valve for greatly restricting the flow at pressures above a first preselected suction and below a second preselected suction in said inlet conduit and for regulating the flow in amounts greater than said greatly restricted flows with the suction pressure in a zone between said preselected suction pressures.

12. The exhaust recirculation control of claim 11 wherein said valve means is fully enclosed in said inlet, exhaust, and connecting conduits.

13. The exhaust recirculation control of claim 11 wherein said valve means is acted on by suction from said inlet conduit and by pressure from said exhaust conduit both tending to move said valve means in the same direction, and acts by varying the size of an orifice of said valve.

14. The exhaust recirculation control of claim 11 having a carburetor and a butterfly throttle, said valve means including an engine-suction-operated motor activated by suction at a carburetor port adjacent to the leading edge of said butterfly throttle, said motor having yieldable means bucking the action of said suction.

15. An exhaust recirculation control for an internal combustion engine having an exhaust conduit for conducting exhaust gases from the engine and an inlet conduit for conducting at least air to the engine, comprising a valve subject to intake suction and exhaust back pressure acting in the same direction to move said valve in a limited stroke against a yieldable means, a fixed opening through which said valve moves in its full stroke, said valve greatly restricting the passage between said valve and said opening at both ends of its stroke and providing a substantially larger passage between said valve and said fixed opening during a substantial portion of its stroke in between said ends, said valve moving in substantial relationship to the combined forces of intake suction and exhaust back pressure across said valve during many different engine operations or during many different operating intake suctions.

16. The exhaust recirculation control of claim 5 wherein said orifice, said means for greatly restricting, and said control means are fully enclosed within said inlet and exhaust conduits and said means for connecting.

17. The exhaust recirculation control of claim 5 having a vacuum port in said inlet conduit adjacent to said throttle valve, said control means including a suction operated motor with a movable wall secured to a stem, one side of said wall communicating with the pressure at said port, the other side being at atmospheric pressure, a valve member secured to said stem, and spring means opposing the movement of said wall toward said suction, said stem directly controlling the size of said orifice.

18. The exhaust recirculation control of claim 5 wherein said control means and said orifice comprise a seat and a valve capable of closing substantially against said seat and having a projection that varies in cross-section and extends through the space surrounded by said seat in all positions of said valve to vary the size of said orifice when said valve is unseated.

19. The exhaust recirculation control of claim 6 wherein said control means is activated by intake suction and exhaust back pressure working together in the same direction.

20. The exhaust recirculation control of claim 19 wherein said means for controlling includes means for greatly restricting the flow of exhaust gases through said means for connecting under engine idle conditions.

21. The exhaust recirculation control of claim 19 wherein said orifice, said means for greatly restricting, and said control means are fully enclosed within said inlet and exhaust conduits and said means for connecting.

22. The exhaust recirculation control of claim 6 having a vacuum port in said inlet conduit adjacent to said throttle valve, said control means including a suction operated motor with a movable wall secured to a stem, one side of said wall communicating with the pressure at said port, the other side being at atmospheric pressure, and spring means opposing the movement of said wall toward said suction, said stem directly controlling the size of said orifice.

23. The exhaust recirculation control of claim 22 wherein said means for controlling includes means for greatly restricting the flow of exhaust gases through said means for connecting under engine idle conditions.

24. The exhaust recirculation control of claim 6 wherein said control means and said orifice comprise a seat and a valve capable of closing substantially against said seat and having a projection that varies in cross-section and extends through the space surrounded by said seat in all positions of said valve to vary the size of said orifice when said valve is unseated.

25. An exhaust recirculation control for an internal combustion engine having an exhaust conduit, an inlet conduit, a throttle controlling the flow of air to said engine through said inlet conduit, exhaust recirculation control valve means controlled by pressures developed in said engine, for controlling the recirculation of gas from said exhaust conduit only to said inlet conduit, for greatly restricting said recirculation at engine idle conditions and at wide-open throttle engine operating conditions and for regulating said recirculation at many zones between idle

*and wide-open operating conditions to provide flow that is substantially greater than the greatly restricted flow.*

*26. The control of claim 25 wherein there is a common wall between a portion of said inlet conduit and a portion of said exhaust conduit, said valve being located so as to pass the recirculating gas through said common wall.*

References Cited

The following references, cited by the Examiner, are of record in the patented file of this patent or the original patent.

UNITED STATES PATENTS

| | | | |
|---|---|---|---|
| 2,154,417 | 4/1939 | Anderson | 123—119 A |
| 2,419,747 | 4/1947 | Wassman | 123—119 A |
| 1,051,690 | 1/1913 | Colwell | 123—119 A |
| 2,640,472 | 6/1953 | Bicknell | 123—127 |
| 2,643,647 | 6/1953 | Meyer et al. | 123—127 |
| 3,237,615 | 3/1966 | Daigh | 123—119 A |
| 3,444,846 | 5/1969 | Sarto et al. | 123—119 A |

WENDELL E. BURNS, Primary Examiner

UNITED STATES PATENT OFFICE
CERTIFICATE OF CORRECTION

Patent No. Re. 27,993 Dated April 30, 1974

Inventor(s) Brooks Walker

It is certified that error appears in the above-identified patent and that said Letters Patent are hereby corrected as shown below:

Column 2, line 59, "operation" should read --operations--.

Column 3, line 29, "control" should read --controls--.

Column 4, line 49, "conduit and valve means for controlling the flow of ex-" should read --conduit for conducting a combustible fluid to the engine,--.

Column 4, line 59, delete "lower" both occurrences.

Column 6, line 42, "claim 19" should read --claim 20--.

Signed and sealed this 8th day of October 1974.

(SEAL)
Attest:

McCOY M. GIBSON JR.
Attesting Officer

C. MARSHALL DANN
Commissioner of Patents

USCOMM-DC 60376-P69
* U.S. GOVERNMENT PRINTING OFFICE : 1969 O—366-334